July 31, 1962 T. J. TVEDT 3,047,810

POLARIZED PHASE DISCRIMINATING CIRCUIT WITH LIMITED DIRECT CURRENT FLOW

Filed April 21, 1958 2 Sheets-Sheet 1

INVENTOR:
THORWALD J. TVEDT
BY: James Todorovic
HIS ATTORNEY

INVENTOR:
THORWALD J. TVEDT
BY: James Todorovic
HIS ATTORNEY

United States Patent Office 3,047,810

Patented July 31, 1962

3,047,810

POLARIZED PHASE DISCRIMINATING CIRCUIT WITH LIMITED DIRECT CURRENT FLOW

Thorwald J. Tvedt, Houston, Tex., assignor to Shell Oil Company, a corporation of Delaware Filed Apr. 21, 1958, Ser. No. 729,757
2 Claims. (Cl. 328—134)

This invention relates to a phase detector and more particularly to a polarized phase detector of the type which produces a direct current voltage representative of the magnitude of the component of a first alternating signal in phase with a second alternating signal of the same frequency.

Previous detectors of this type have applied the first alternating signal across the primary of a transformer whose secondary is connected in series with a first rectifier, a center tapped impedance network that contains parallel resistors and capacitors and a second rectifier in push-pull relationship with the first rectifier. The second alternating signal which serves as a reference voltage for the detector is applied across the primary of a second transformer whose secondary is connected between a center tap on the secondary on the first transformer and the center tap of the impedance network. The output of the detector appears across the impedance network and, when the signals applied to the detector are of the same frequency and are phased in quadrature to each other, no output voltage appears. When the signals are out of quadrature, the detector develops a direct current voltage having a magnitude and polarity representative of the component of the first signal which is in phase with the reference signal and a signal of opposite polarity when the first signal is in counterphase with the reference signal.

While such phase detectors are widely used they are efficient only when the ratio of the resistance of the parallel resistance-condenser network to the impedance associated with the transformer is high. Most signals have a relatively low level and thus must be amplified prior to the transformers or by the use of step-up transformers which results in introducing considerable impedance prior to the rectifiers which greatly reduces the efficiency of the detector. Furthermore, the direct current from the impedance network flows through the transformers of the basic detector circuit which is detrimental to the performance of these transformers at low frequencies, while the shunt capacity of the transformers at high frequencies greatly reduces the signal response.

With these problems in mind, it is a principal object of this invention to provide a novel phase detector having increased sensitivity and efficiency.

A further object of this invention is to provide unique phase detectors which respond particularly effectively to (*a*) both low and medium high frequency signals and (*b*) both medium and high frequency signals.

A further object of this invention is to provide a phase detector with a novel means for combining the two signals that substantially eliminates the condition that direct current flow in the transformer.

A further object of this invention is to provide a phase detector with a novel means for combining the two signals that eliminates the use of transformers.

A still further object of this invention is to provide a phase detector with a novel circuit means which combines the alternating signals at a low signal level and then amplifies the signals and applies them to the rectifiers in the form of high level signals having low impedances.

A still further object of this invention is to provide a phase detector in which the alternating signals are first combined at a low signal level and then amplified by a voltage amplifier. After the signals are amplified they are coupled to an impedance changing device with an adjustable impedance which supplies a signal to the rectifiers and impedance network, with the ratio of the resistance of the parallel resistance-condenser network to the impedance changing device being adjustable to a favorable ratio for efficient operation with square wave signals.

These and other objects of this invention are obtained by providing a means for combining the two alternating signals followed by two voltage amplifiers which amplify the combined signals. The outputs of the voltage amplifiers are coupled to two cathode follower circuits whose cathodes in turn are connected in series with the rectifiers and the center tapped impedance network having a parallel resistance and a capacitance branch. The output of the rectifiers appears across the resistance branches of the impedance network as a direct current voltage whose polarity and magnitude is representative of the component of the first signal in phase or in counterphase with the reference signal.

These and other objects and advantages of this invention will be more easily understood from the following detailed description of a preferred embodiment when taken in conjunction with the attached drawings in which.

Figure 1:
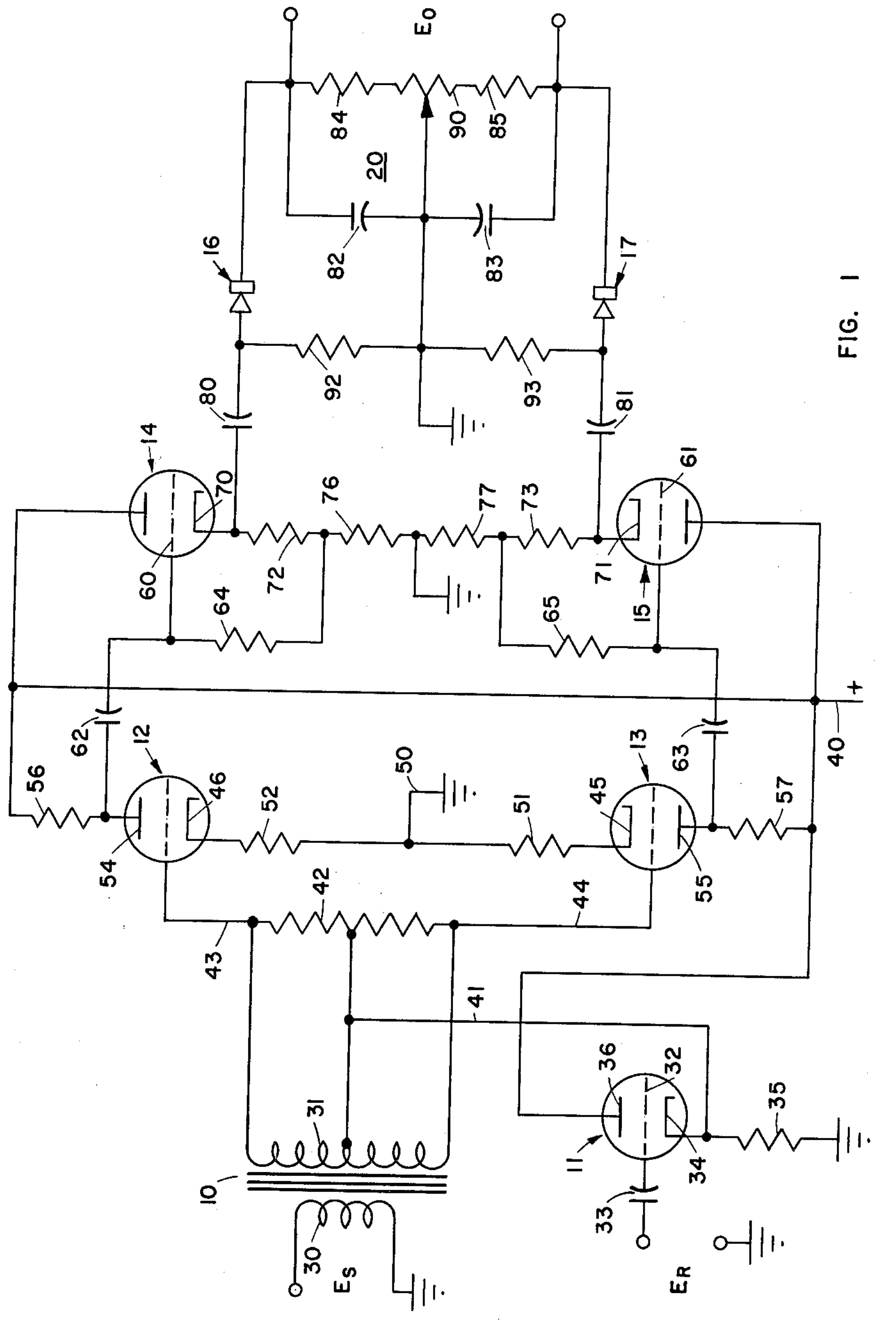
FIG. 1 is a drawing of an amplifying phase discriminator which employs a transformer for combining the two signals and is particularly effective at the lower and medium frequency ranges.

Referring to FIGURE 1 there is shown a first signal $E_s$ which is coupled to the primary of transformer 10. The reference signal $E_r$ is supplied by a cathode follower circuit 11 and connected to the center tap on the transformer. The opposite ends of the secondary of the transformer are connected to two voltage amplifiers 12 and 13. The output of the voltage amplifiers 12 and 13 are coupled to two additional cathode followers 14 and 15. The cathodes of the two cathode followers 14 and 15 are connected in series with two rectifiers 16 and 17 and a center tapped impedance network 20 having parallel resistance and capacitance branches having time constants which are large compared to one cycle of the signal.

When the signal $E_s$ contains a component in phase or counterphase with $E_r$, an output signal $E_o$ appears across the resistance branches of the impedance network. The output signal is a direct current voltage which has a polarity corresponding to the in-phase or counterphase relation between $E_r$ and this component of $E_s$, and a magnitude corresponding to the magnitude of this component of $E_s$.

The signal $E_s$ is connected to one end of the primary winding 30 of the transformer 10 while the other end of the primary winding is connected to ground. The signal $E_s$ may be any alternating signal having any wave shape such as square or sinusoidal. The reference signal $E_r$ is coupled to the grid 32 of the cathode follower 11 through a capacitor 33 and to ground through a resistance 35. The plate 36 of the cathode follower 11 is connected to the positive power supply 40 while the cathode 34 is connected to ground through the resistance 35. The cathode 34 is also connected to the center tap on the secondary 31 of the transformer and a center tap on a shunt resistance 42 which is disposed in parallel relationship with the secondary 31.

The upper end of the secondary winding is connected to the grid of the voltage amplifier 12 by means of a lead 43 while the lower end of the secondary is connected to the grid of the voltage amplifier 13 by means of a lead 44. The cathode 46 of the amplifier 12 is connected to a ground 50 through a fixed resistance 52 while the cathode 45 of the amplifier 13 is connected to the ground 50 through a fixed resistance 51. The plate 54 of the amplifier 12 is connected to the positive power supply 40 through a resistance 56 while the plate 55 of the amplifier 13 is connected to the positive power supply through a resistance 57.

The bias on the grid of voltage amplifier 12, with respect to its cathode, is the algebraic sum of the direct current voltage drops across resistor 35 of cathode follower 11 and resistor 52 in the cathode circuit of amplifier 12. Similarly, the bias on the grid of amplifier 13, with respect to its cathode, is the algebraic sum of the direct current drops across resistors 35 of cathode follower 11 and resistor 51 in the cathode circuit of amplifier 13. By proper design and choice of circuit components the individual voltage drops across resistors 51 and 52 can be made to exceed the voltage drop across resistor 35 so that the net bias voltages on the two grids are sufficiently negative to insure linear operation of the amplifier with no flow of grid current in transformer 10. Since cathode resistors 51 and 52 are not bypassed to ground for alternating current signals negative feedback is introduced in voltage amplifiers 12 and 13 and results in stable operation. It is a well-known fact that a direct current component in a transformer decreases the incremental inductance and causes a loss of response to signals in the low frequency range. Because of the absence of any direct current component transformer 10 can therefore be a high quality transformer with low frequency response, and the signals $E_s$ and $E_r$ may be combined without any discrimination at low frequencies.

The output of the amplifier 12 is coupled to the grid 60 of the cathode follower 14 through a capacitor 62 and a fixed resistance 64. The output of the amplifier 13 is similarly coupled to the grid 61 of the cathode follower 15 through a capacitor 63 and a resistance 65. The cathode 70 of the cathode follower 14 is connected to ground through two separate resistors 72 and 76 while the cathode 71 of the other cathode follower is also connected to ground through separate resistors 73 and 77. The grid resistor 64 is connected to the common connection between the cathode resistors 72 and 76 while the grid resistor 65 is connected to the common connection between the cathode resistors 73 and 77 in order to obtain correct grid bias for linear operation of the cathode followers. The plates of cathode followers 14 and 15 are connected to the positive power supply.

The cathode of the cathode follower 14 is coupled to the rectifier 16 through a coupling capacitor 80 and a coupling resistance 92 while the cathode 71 of the cathode follower 15 is coupled to the rectifier 17 through a coupling capacitor 81 and a resistance 93. While the rectifiers 16 and 17 are shown as semi-conductor type rectifier elements, other suitable types of rectifiers may also be used, such as vacuum tube diodes. The output from the rectifier 16 is connected to one end of the impedance network 20 while the rectifier 17 is connected to the opposite end of the impedance network. The impedance network consists of two parallel branches, one branch comprising capacitors 82 and 83 and the other branch consisting of fixed resistors 84 and 85, and a variable resistor 90. The impedance network is a center tapped network with the common connection between the two capacitors 82 and 83 being connected to ground and the resistors 84 and 85 also being connected, through variable resistance 90, to ground.

The direct currents flowing through rectifiers 16 and 17 charge the condensers 82 and 83 and the discharge currents flow through resistances 84 and 85. The voltages across the resistances 84 and 85 are in opposition so that the net output voltage, $E_o$, is zero when the two voltages are equal. When only one signal, for example the reference voltage, $E_r$, is applied to the discriminator then the output voltage, $E_o$, would be zero if the voltage amplifiers, rectifiers, and components were exactly equal in the two parallel paths from the point of application of the signal, $E_r$, to the output circuit. Such a condition is difficult to realize in practice; in such a test the variable resistance 90 is therefore adjusted to make the output voltage, $E_o$, zero and compensate for minor inequalities that may exist in the parallel circuits.

When a signal voltage $E_s$ having an alternating wave form, preferably sinusoidal, is connected to the primary of the transformer 10 and a reference voltage having an alternating wave form of the same frequency as the signal $E_s$ is supplied to the cathode follower 11 the two halves of the secondary winding of the transformer will supply voltage outputs representative of the vector sum of the voltages $E_s$ and $E_r$ and the vector difference between the $E_s$ and $E_r$. Of course, which branch of the secondary winding supplies which voltage will depend on the polarity of the reference voltage.

These sum and difference voltages will be applied to the two voltage amplifiers 12 and 13 which will increase the signal level of the voltages. The increased voltage signals are coupled to the cathode followers 14 and 15 whose output impedances are low. The cathode followers supply the signals, at approximately the same voltage level, to the two rectifiers through condensers 80 and 81. The rectified signal is applied to the impedance network 20 and the direct current output voltage, $E_o$, is proportional in magnitude and corresponds in polarity to the component of the signal, $E_s$, which is in phase or counterphase with the reference voltage, $E_r$.

From the above description of the operation of this invention it can be seen that the two voltages $E_s$ and $E_r$ are combined with the use of only one transformer at a relatively low signal level. The low frequency response of the transformer is not impaired since no direct current component is present in the transformer. The combined signals are amplified to a desired level and then applied to cathode followers. The output signals from the low impedance cathode followers are coupled to the rectifiers and the rectified current applied to the output impedance network. A high ratio of the resistances in the impedance network to the impedance of the signal source (cathode followers) can then be realized and a fundamental condition is satisfied for optimum efficiency.

Figures 2, 3:
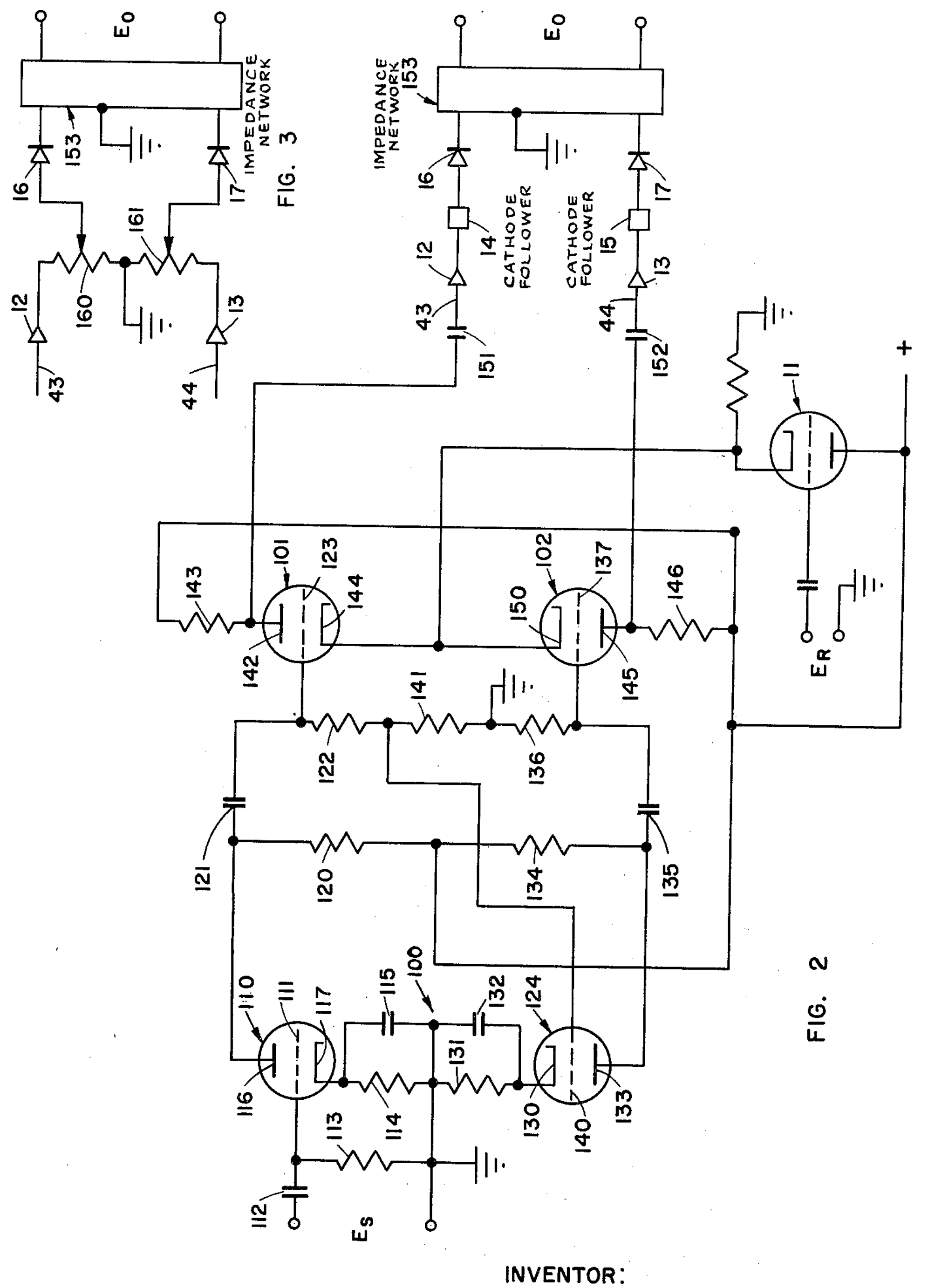
FIG. 2 is a drawing of an amplifying phase discriminator which employs a phase inverter and an amplifier for combining the two signals and is particularly effective in the higher frequency ranges.
FIG. 3 is a partial drawing of the amplifying phase discriminator of FIG. 2 in which the output impedance of the voltage amplifiers may be adjusted for effective and favorable operation as in the case when the signals are of square wave form.

Referring now to FIGURE 2 there is shown a second means whereby the first signal $E_s$ may be combined with the reference signal $E_r$ to provide two signals one of which is equal to the vector difference of $E_s$ and $E_r$, the other of which is equal to the vector sum of $E_s$ and $E_r$. This means utilizes a phase inverter 100 which supplies two output signals which have the same wave form but have opposite instantaneous polarities. These output signals are coupled to the grids of the triodes 101 and 102 whose cathodes are supplied with the reference signal $E_r$ from the cathode of follower circuit 11. The two triodes 101 and 102 thus supply two output signals which are equal to the vector sum and the vector difference of signals $E_r$ and $E_s$. The signals from the triodes 101 and 102 are coupled to the amplifiers 12 and 13 shown in FIGURE 1 by means of leads 43 and 44 with the remainder of the circuit being the same as that shown in FIGURE 1.

The phase inverter 100 utilizes two triode tubes, one of which, 110, is used as a voltage amplifier while the other one, 124, is utilized as a phase inverter. The signal $E_s$ is coupled to the grid 111 of tube 110 by means of capacitor 112 and resistor 113, one end of which is connected to ground. The cathode 117 of the tube 110 is also connected to ground by means of a parallel resistance 114 and capacitance 115. The plate 116 is connected to the positive high voltage power supply through a load resistor 120 and in addition is connected to the grid 123 of the tube 110 through a coupling capacitor 121.

The cathode 130 of the lower tube 124 is connected to ground through a parallel resistance 131 and capacitance 132 while the plate 133 is connected to the positive high voltage supply through a load resistor 134. The plate in addition is coupled to the grid 137 of the tube 102 through a coupling capacitor 135. Three series connected resistances 122, 136 and 141 are connected to the grids 123 and 137 of the tubes 101 and 102, respectively. The common connection between the resistances 141 and 136 is connected to ground, while the grid 140 of the tube 124 is connected to the common connection between the resistances 122 and 141.

From the above description it can be appreciated that the tube 110 will act as an amplifier while the tube 124 will act as a phase inverter and thus the output signal from the two tubes will have substantially the same wave form but of opposite polarity. The grid 140 of the tube 124 should be supplied with a signal of the opposite polarity to the signal supplied to the grid 111 of tube 110 and of proper magnitude which signal can be obtained by providing resistors 122 and 141 of the proper size. This will insure that if a positive signal is applied to the grid of the tube 110 a negative signal of substantially the same magnitude will be supplied to the grid 140. Thus the output of the two tubes will have substantially the same wave form but opposite instantaneous polarity.

The plate 142 of the tube 101 and the plate 145 of the tube 102 are both connected to the positive high voltage power supply through biasing resistors 143 and 146, respectively. The cathodes 144 and 150 of these tubes are connected in series and in addition are connected to the cathode of the cathode follower circuit 11 shown in FIGURE 1 and described above. Thus the two tubes 101 and 102 will serve to supply output signals which are equal to the vector sum and vector difference of the two signals $E_s$ and $E_r$. The plates of these tubes are connected to the amplifiers 12 and 13 shown in FIGURE 1 by means of leads 43 and 44 and coupling capacitors 151 and 152, respectively. The amplifiers are connected to the cathode follower circuits 14 and 15 which in turn are connected to the rectifier elements 16 and 17. The rectifier elements are connected to an impedance network 153 which is same as that shown in FIGURE 1 and described above. The voltage appearing across the impedance network has a magnitude which is equal to the component of the signal $E_s$ which is either in phase or counterphase with the signal $E_r$. The polarity of the voltage $E_0$ across the impedance network indicates of course whether the signal $E_s$ is in phase or counterphase with the signal $E_r$.

From the above description it can be seen that a means has been provided by which the two signals $E_s$ and $E_T$ may be combined to give two signals which are equal to the vector sum and vector difference of the signals without the use of transformer. As explained above the use of a transformer for this function has several disadvantages such as their lack of response to lower frequency signal as well as their reduction of high frequency signal due to their impedance.

Referring to FIGURE 3 there is shown a simple means by which the impedance of the signals of the amplifiers

12 and 13 may be changed without the use of cathode follower circuits. This means consists of two potentiometers 160 and 161 which are connected in series between the amplifiers 12 and 13 and the rectifier elements 16 and 17, respectively. By adjusting the value of the potentiometers the most favorable condition can be arrived at for the application of a square wave form signal to the rectifier elements 16 and 17. The remainder of the circuit in FIGURE 3 is exactly the same as that shown in FIGURE 2 and described above.

While only three embodiments of this invention have been described in detail many modifications and improvements will occur to those skilled in the art to which the invention pertains. For example, the impedance changing means of FIGURE 3 could also be used in the circuit shown in FIGURE 1 with only minor modifications. Thus this invention should not be limited to the particular details described but only to its broad spirit and scope.

I claim as my invention:

1. A polarized phase detector having limited direct current flow, said phase detector comprising: inductive means for combining a first signal and a reference signal to supply a first output signal equal to the vector sum of said first and said reference signals and a second output signal equal to the vector difference of said first and said reference signal; separate vacuum tube amplifier means for said first and second output signals; each of said separate amplifier means being coupled to separate cathode follower devices having low internal impedance; each of said cathode follower devices being coupled to a separate rectifier; the output of said separate rectifiers being coupled to an impedance network, the voltage across said impedance network being proportional to the component of said first signal in phase with said reference signal.

2. A polarized phase detector having limited direct current flow, said phase detector comprising: a first signal connected to the primary of a transformer; a resistance shunted across the secondary of said transformer; a cathode follower circuit coupled to a center tap on said secondary and said shunt resistance to supply a reference frequency to said transformer; the opposite ends of said secondary being coupled to separate vacuum tube amplifiers; said amplifiers being coupled to separate cathode follower circuits, each of said separate cathode follower circuits being coupled to a separate rectifier; said rectifiers being coupled to opposite ends of an impedance network, the voltage across said impedance network being proportional to the component of said first signal in phase with said reference signal.

References Cited in the file of this patent

UNITED STATES PATENTS

| | | |
|---|---|---|
| 2,527,096 | Howes | Oct. 24, 1950 |
| 2,577,668 | Wilmotte | Dec. 4, 1951 |
| 2,644,084 | O'Brien | June 30, 1953 |
| 2,684,465 | Schmitt | July 20, 1954 |
| 2,694,143 | Chambers | Nov. 9, 1954 |
| 2,751,555 | Kirpatrick | June 19, 1956 |
| 2,794,928 | Frank | June 4, 1957 |
| 2,833,918 | Knox | May 6, 1958 |
| 2,889,473 | Ingham | June 2, 1959 |
| 2,890,329 | Lebenbaum | June 9, 1959 |